United States Patent
Lin

(10) Patent No.: US 12,253,848 B2
(45) Date of Patent: Mar. 18, 2025

(54) MACHINE ABNORMALITY MARKING AND ABNORMALITY PREDICTION SYSTEM

(71) Applicant: PIMQ Co., Ltd., Taipei (TW)

(72) Inventor: Hsiang-Chun Lin, Taipei (TW)

(73) Assignee: PIMQ CO., LTD., Taipei (TW)

( * ) Notice: Subject to any disclaimer, the term of this patent is extended or adjusted under 35 U.S.C. 154(b) by 457 days.

(21) Appl. No.: 17/709,465

(22) Filed: Mar. 31, 2022

(65) Prior Publication Data

US 2023/0126822 A1    Apr. 27, 2023

(30) Foreign Application Priority Data

Oct. 22, 2021    (TW) ................. 110139363

(51) Int. Cl.
| | | |
|---|---|---|
| G05B 23/02 | (2006.01) | |
| G06F 18/214 | (2023.01) | |
| G06N 3/08 | (2023.01) | |
| G06F 18/24 | (2023.01) | |

(52) U.S. Cl.
CPC ....... G05B 23/024 (2013.01); G05B 23/0221 (2013.01); G05B 23/0272 (2013.01); G05B 23/0281 (2013.01); G06F 18/214 (2023.01); G06N 3/08 (2013.01); G06F 18/24 (2023.01)

(58) Field of Classification Search
CPC .............. G05B 23/024; G05B 23/0221; G05B 23/0272; G05B 23/0281
See application file for complete search history.

(56) References Cited

U.S. PATENT DOCUMENTS

2018/0164781 A1* 6/2018 Kubo ................. G05B 19/4083
2022/0178737 A1* 6/2022 Becker ................. G05B 23/024

OTHER PUBLICATIONS

Chen et al., "Time Series Data for Equipment Reliability Analysis With Deep Learning" IEEE Access vol. 8, 2020 (Year: 2020).*
Colone et al., "Predictive repair scheduling of wind turbine driveâtrain components based on machine learning" Wind Energy 2019; 22:1230-1242 (Year: 2019).*
Kohli "Using Machine Learning Algorithms on data residing in SAP ERP Application to predict equipment failures" International Journal of Engineering & Technology, 7 (2.28) (2017) 312-319 (Year: 2017).*

* cited by examiner

Primary Examiner — John C Kuan
(74) Attorney, Agent, or Firm — Leong C. Lei

(57) ABSTRACT

The present invention provides a machine abnormality marking and abnormality prediction system connected with a factory host and including a parameter streaming unit connected with the machines, an abnormality reporting unit, a prediction analysis unit, and a neural network classifier. The parameter streaming unit and the abnormal reporting unit collect data of each machine in the factory, and the collected data are compared and analyzed with historical records by the prediction analysis unit. The generated parameter values can be continuously compared with the collected data to predict the state of each machine in the factory, and provide an early warning of possible abnormality or need of maintenance, so that the personnel in the factory can arrange production line maintenance or capacity adjustment in advance or adjust the machine of the factory production line, to avoid occasional shutdown and reduce factory losses.

10 Claims, 2 Drawing Sheets

MACHINE ABNORMALITY MARKING AND ABNORMALITY PREDICTION SYSTEM

BACKGROUND OF THE INVENTION

Technical Field of the Invention

The present invention relates to a machine abnormality marking and abnormality prediction system, and more particularly, to a machine abnormality marking and abnormality prediction system which can predict the possible abnormality or need for maintenance of each machine in the factory, so that the factory personnel can arrange maintenance or capacity adjustment of the production line in advance, thereby improving factory efficiency and reduce the occasional shutdown of the production line.

Description of Related Art

With the digitalization and evolution of modern machines, many machines may utilize various means, such as the programmable logic controllers (PLC) and gateway devices, to connect the data of factory machines quickly and efficiently to other computers or systems for further analysis and judgment. Meanwhile, with the development of machine learning algorithms, as the health status of machines (normal, abnormal, and malfunctioning) are predicted based on parameters, the plans of maintenance has become more and more important.

The general use of traditional machines is that the machine manufacturer performs associated adjustment based on the attributes of the ex-factory machines, and products and environment of the factory, and set fixed upper and lower limits so that the field operators can make fine adjustments at any time according to the materials, environment and related parameters produced by the factory production line. However, in on-site factory use, on one hand, different settings or even modifications might be applied on different production tasks. On the other hand, as time goes by, the performance difference of the machines generally increases day by day, so that the use of fixed parameter values cannot effectively reflect the actual states. In general, the factory operators tend to adjust according to their own instant judgments or experience.

However, the correctness of this kind of judgment criteria only resides in the factory operators themselves, without resorting to written records, and thus it is impossible to judge whether the parameter adjustment is optimal for the machines.

Supervised learning in machine learning may be a way to solve the problem, but this kind of solution usually requires markings in a plenty of data as well as the using the Maximum Likelihood to train a neural network classifier, so as to learn the mapping relationship between machine data and malfunction abnormalities.

This kind of method, however, usually requires a lot of manpower in the beginning stage to judge and mark whether the machine data is abnormal or not. In addition, as mentioned above, as time goes by, the aging of the machine will also cause the numerical values to be unfit, and thus it is not realistic to use one-time only marking data to predict the abnormal states of the machines.

In view of the above, the inventor of the present application provides the solution based on many years working experiences combining the design experience of network and communication.

SUMMARY OF THE INVENTION

An objective of the present invention is to provide a machine abnormality marking and abnormality prediction system, which stores and counts the data of machines in operation with a specific period, and continuously compares equal amount of malfunction and abnormality parameters of the historical record of the machines in operation, so as to predict the operation state of the machines and thereby generates abnormality warnings. In this way, the factory can arrange maintenance in advance or adjust the machine of the factory production line, to avoid occasional shutdown and reduce factory losses.

To achieve the above objective, the present invention provides a machine abnormality marking and abnormality prediction system, which is connected with a host connecting to machines in a factory and comprises a parameter streaming unit connected with the machines, an abnormality reporting unit, a prediction analysis unit, and a neural network classifier.

The parameter streaming unit comprises a streaming server, a protocol server, a database server and a static server, wherein the streaming server is connected with each machine through a gateway device and comprises a shutdown module and maintenance module to transmit data of shutdown and maintenance of said each machine in operation through the protocol server; the database server is connected with the protocol server to periodically store data of said each machine in operation from the protocol server; and the static server is connected with the database server to count and average the data of said each machine in operation with a specific period;

an abnormality reporting unit comprising at least one handheld device and wirelessly connected with a streaming server of the parameter streaming unit, wherein the abnormality reporting unit transmits abnormality reasons and occurrence time caused by the shutdown of said each machine in operation to the shutdown module for storage, and transmits the abnormality reasons and occurrence time to the maintenance module for recording;

The prediction analysis unit comprises a microprocessor, a time sequence recorder and a neural network classifier, wherein the microprocessor is connected with the static server and the abnormality reporting unit to store the data of said each machine in operation analyzed and averaged with the specific period by the static server as historical data value, and store the abnormality reasons and occurrence time caused by the shutdown and maintenance of said each machine in operation reported by the abnormality reporting unit as instant data value which serves as a prediction value for training the neural network classifier; and the time sequence recorder is connected with the microprocessor to extract one-dimensional vectors and combine the one-dimensional vectors in series with specific second, minute and hour as time sequence. The neural network classifier connected with the time sequence recorder and comprising a first trigger body and second trigger body to continuously use a minimal difference to predict a cross entropy loss in the instant data value and historical data value in order to optimize the neural network module and accordingly predict states of machines, so as to generate abnormality warnings, for factory workers to arrange maintenance or adjust machines of factory production lines in advance to avoid occasional shutdown and reduce the factory loss.

According to the above, the protocol server comprises an object linking and embedding (OLE) for process control (OPC), which is used to read the shutdown and maintenance data of each machine in operation, and perform transmission according to the shutdown module and the maintenance module of the streaming server. The database server comprises a redis cache, to periodically store the shutdown and maintenance data of each machine in operation from the protocol server for cache use.

According to the above, the static server counts and averages the data of said each machine with the specific period which refers to one minute.

According to the above, the time sequence recorder uses time sequence with specific second minute and hour, which takes second as unit to define the time sequence of the past 60 seconds of said each machine in operation as $X_{sec}$, takes minute as unit to define the time sequence of the past 30 minutes of said each machine in operation as $X_{min}$, and takes 30 minutes as unit to define the time sequence of the past 12 hours of said each machine in operation as $X_{hr}$.

According to the above, updating the neural network module with the marking of the specific period is to update with the mark of said each machine in operation in past 30 days.

According to the above, establishing the new neural network module using the random sampling of said specific period is to combine renewed random sampling of the most recent said each machine in operation with the instant data value and historical data value in past 30 days to establish the new neural network.

According to the above, the handheld device in the abnormality reporting unit is a smart phone, tablet, or laptop.

DETAILED DESCRIPTION OF THE INVENTION

Figure 1:
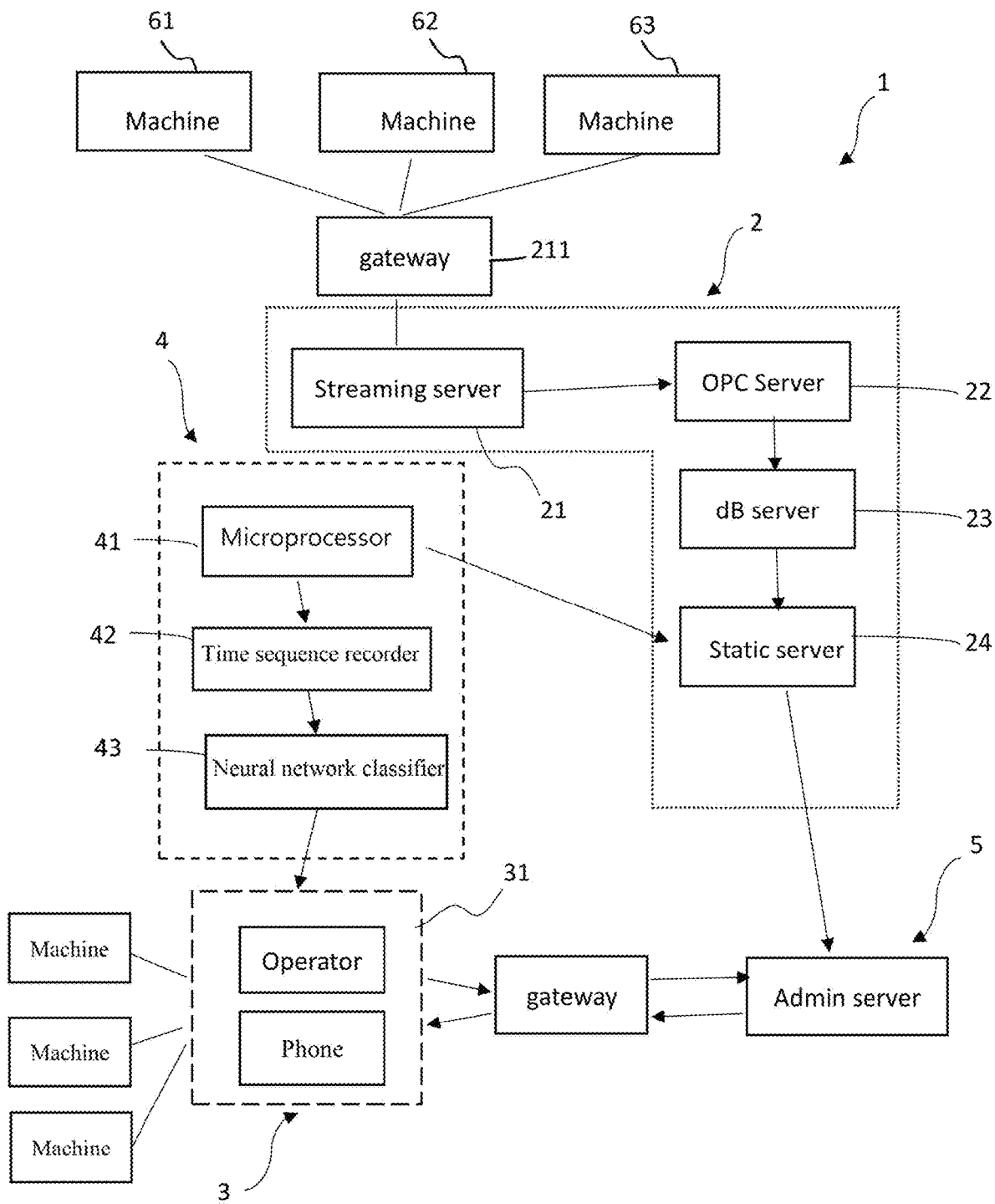
FIG. 1 is a diagram illustrating a machine abnormality marking and abnormality prediction system according to the present invention.

Please refer to FIG. 1, which is a diagram illustrating a machine abnormality marking and abnormality prediction system according to the present invention. As shown in FIG. 1, the abnormality marking and abnormality prediction system 1 of the present invention machine is connected with a factory host 5, and comprises a parameter streaming unit 2, an abnormality reporting unit 3 and a prediction analysis unit 4, wherein the parameter streaming unit 2 comprises: a streaming server 21, a protocol server 22, a database server 23, and a static server 24, wherein the streaming server 21 is connected with each of the machines 61-63 through the gateway device 211, and comprises a shutdown module and maintenance module. The protocol server 22 provides an object linking and embedding (OLE) for process control (OPC), to read the shutdown and maintenance data of each machine in operation, and perform transmission according to the shutdown module and the maintenance module of the streaming server. The database server 23 is connected with the protocol server 22, and comprises a redis cache to periodically store the shutdown and maintenance data of each of the machines 61-63 in operation from the protocol server 22 for cache use. The static server 24 is connected with the database server 23, to count and average the data of each of the machines 61-63 in operation with a specific period (e.g., 1 minute), to accelerate the speed of reading subsequent data in various sizes.

The abnormality reporting unit 3 comprises at least one handheld device 31, which can be a smart phone, tablet, or laptop. In this embodiment, the handheld device 31 is illustrated as a smart phone, which is held and used by a machine operator. The handheld device 31 is wirelessly connected with the streaming server 21 of the parameter streaming unit 2, which is capable of transmitting, through the operation of the operator, the abnormality reasons and occurrence time caused by the shutdown of each machine in operation to the shutdown module for storage through the operation of the operator. In addition, the handheld device 31 can also transmit, through the operation of the operator, the abnormality reasons and occurrence time caused by the maintenance of each machine in operation to the shutdown module for recording.

Figure 2:
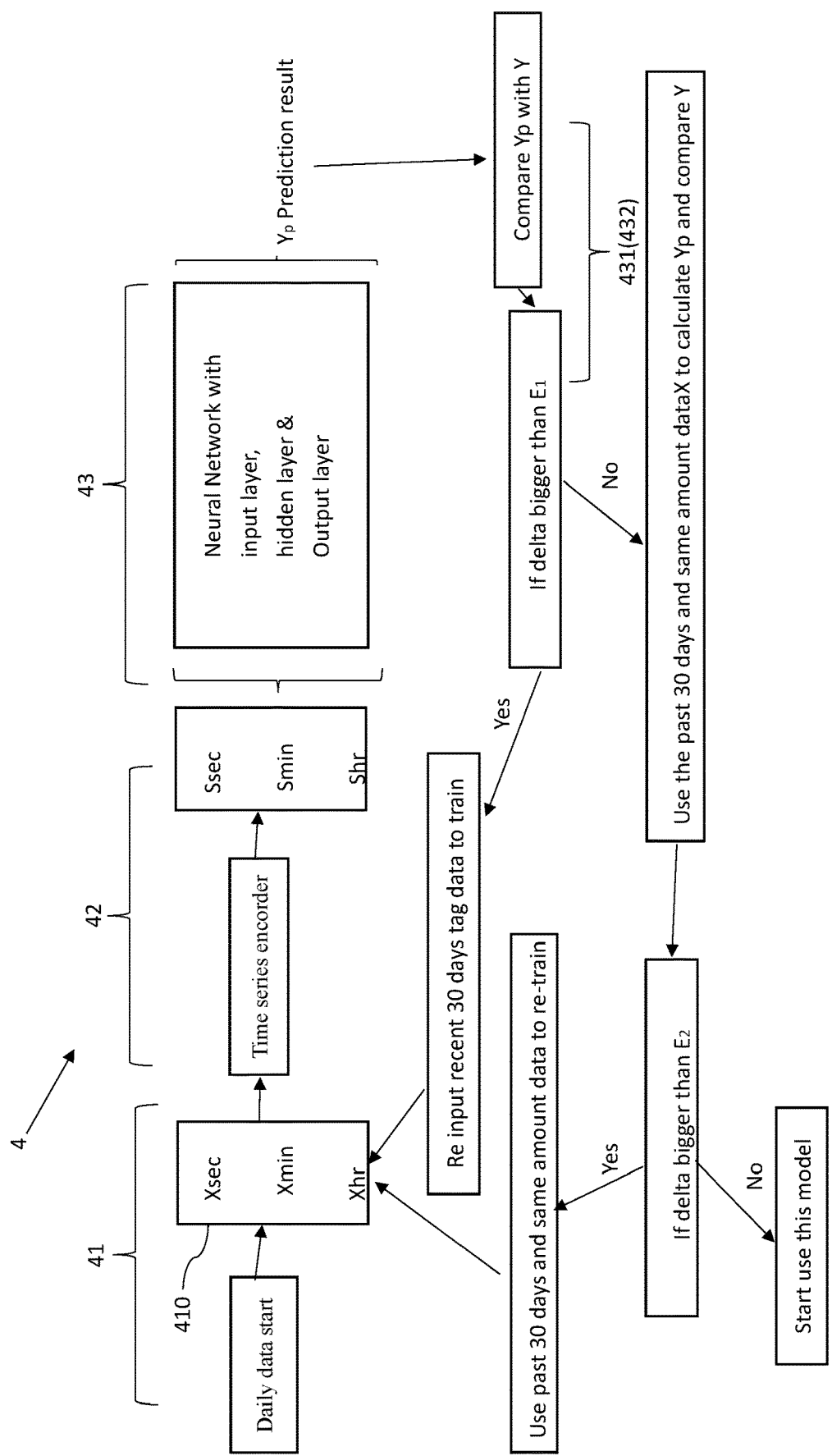
FIG. 2 is a diagram illustrating a prediction analysis unit of the abnormality marking and abnormality prediction system according to the present invention.

The prediction analysis unit 4 comprises a microprocessor 41, a time sequence recorder 42 and a neural network classifier 43, which can be referred to FIG. 2. The microprocessor 41 is connected with the static server 24 and the abnormality reporting unit 3, and can store the data of each machine in operation calculated with the specific period (such as 1 minute) and averaged by the static server 24 as a historical data value. In addition, the microprocessor 41 can store the abnormality reasons and occurrence time caused by the shutdown and maintenance of each machine in operation reported by the abnormality reporting unit 3 as an instant data value. The instant data value can be also viewed as a referential prediction value for training the neural network classifier 43. The time sequence recorder 42 is connected with the microprocessor 41, and uses time sequence 410 with specific second, minute and hour, which is to take second as unit to define the time sequence of the past 60 seconds of said each machine in operation as $X_{sec}$, take minute as unit to define the time sequence of the past 30 minutes of said each machine in operation as $X_{min}$, and take 30 minutes as unit to define the time sequence of the past 12 hours of said each machine in operation as $X_{hr}$, so as to extract one-dimensional vectors and connect them in series. The neural network classifier 43 is connected with and the time sequence recorder 42, and comprises first trigger body 431 and second trigger body 432. The first trigger body 431 utilizes the minimal difference to predict "the instant data value" (denoted by $y_{pred}$) and the cross-entropy loss in "the historical data value" (denoted by y) according to "the instant data value and historical data value" received from the time sequence recorder every day, in order to optimize neural network module. That is, if "the instant data value" minus "the historical data value" is greater than the prediction error (denoted by $\varepsilon_1$, where $\varepsilon_1 = y - y_{pred}$), the neural network module will be updated by the markings of said specific period (i.e., the recent 30 days). On the other hand, if "the instant data value" minus "the historical data value" is smaller than the prediction error, the second trigger body 432 is utilized to receive "the instant data value and historical data value" from the time sequence recorder in a random sampling manner, and the equal amount "instant data value and historical data value" are used to test the precision of the neural network module constructed by the first trigger body 431, that is, if the value of the previous prediction error ($\varepsilon_1$) divided by the "historical data value" is greater than the later prediction error (denoted by $\varepsilon_2$, where $\varepsilon_2 = \varepsilon_1 / y$), the random sampling of said specific period and another set of equal amount "instant data value and historical data value" will be used in prediction. That is, said each machine in operation is re-sampled randomly so as to build a new neural network module in cooperation with the equal amount "instant data value and historical data value" in past 30 days, so as to retrain, predict the states of machines, and provide abnormality warnings, so that the personnel in the factory can arrange production line maintenance or capacity adjustment in advance or adjust the machines of the factory production line, to avoid occasional shutdown and reduce factory losses.

Please refer to FIG. 2, which is a diagram illustrating a prediction analysis unit of the abnormality marking and abnormality prediction system according to the present invention. As can be seen from the architecture of the prediction analysis unit 4, the neural network classifier 43 takes the abnormality reason and occurrence time of each machine in operation shutdown and maintenance from the time sequence recorder 42 as the input, which adopts the sequence 410 with specific second, minute and hour, so as to use the first trigger body 431 and second trigger body 432 to perform continuous learning and training in neural network, and then output usable prediction values of the neural network module. In this way, the states of the machines can be predicted, and the abnormality markings and abnormality warnings can be thereby generated, so that the personnel in the factory can arrange production line maintenance or capacity adjustment in advance or adjust the machine of the factory production line, to avoid occasional shutdown and reduce factory losses.

To sum up, the virtual foreman dispatch planning system of the present invention can ensure the innovative purpose and meet the requirements of patent applications. However, what are described above are merely preferred embodiments of the present invention. Modifications and changes made according to the present invention shall fall into the scope of this patent application.

What is claimed is:

1. A machine abnormality marking and abnormality prediction system connected with a host connecting to machines in a factory, comprising:

a parameter streaming unit connected with the machines and comprising a streaming server, a protocol server, a database server and a static server, wherein the streaming server is connected with each machine of the machines through a gateway device and comprises a shutdown module and maintenance module to transmit data of shutdown and maintenance of said each machine in operation through the protocol server; the database server is connected with the protocol server to periodically store data of said each machine in operation from the protocol server; and the static server is connected with the database server to count and average the data of said each machine in operation with a specific period;

an abnormality reporting unit comprising at least one handheld device and wirelessly connected with a streaming server of the parameter streaming unit, wherein the abnormality reporting unit transmits abnormality reasons and occurrence time caused by the shutdown of said each machine in operation to the shutdown module for storage, and transmits the abnormality reasons and occurrence time to the maintenance module for recording;

a prediction analysis unit comprising a microprocessor, a time sequence recorder and a neural network classifier, wherein the microprocessor is connected with the static server and the abnormality reporting unit to store the data of said each machine in operation analyzed and averaged with the specific period by the static server as historical data value, and store the abnormality reasons and occurrence time caused by the shutdown and maintenance of said each machine in operation reported by the abnormality reporting unit as instant data value which serves as a prediction value for training the neural network classifier; and the time sequence recorder is connected with the microprocessor to extract one-dimensional vectors and combine the one-dimensional vectors in series with specific second, minute and hour as time sequence; and the neural network classifier connected with the time sequence recorder and comprising a first trigger body and second trigger body to continuously use a minimal difference to predict a cross entropy loss in the instant data value and the historical data value in order to optimize a neural network module and accordingly predict states of machines, so as to generate abnormality warnings, for factory workers to arrange maintenance or adjust machines of factory production lines in advance to avoid occasional shutdown and reduce a factory loss.

2. The machine abnormality marking and abnormality prediction system of claim 1, wherein the static server counts and averages the data of said each machine with the specific period which refers to one minute.

3. The machine abnormality marking and abnormality prediction system of claim 1, wherein the time sequence recorder uses time sequence with specific second minute and hour, which takes second as unit to define the time sequence of the past 60 seconds of said each machine in operation as $X_{sec}$, takes minute as unit to define the time sequence of the past 30 minutes of said each machine in operation as $X_{min}$, and takes 30 minutes as unit to define the time sequence of the past 12 hours of said each machine in operation as $X_{hr}$.

4. The machine abnormality marking and abnormality prediction system of claim 1, wherein the neural network classifier using the minimal difference to optimize the neural network module is to utilize the first trigger body to receive prediction error of the instance data value and the historical data value from the time sequence recorder every day, and if a result of the instant data value minus the historical data value is greater than the prediction error, the neural network module is updated with a marking of the specific period.

5. The machine abnormality marking and abnormality prediction system of claim 4, wherein updating the neural network module with the marking of the specific period is to update with the marking of said each machine in operation in past 30 days.

6. The machine abnormality marking and abnormality prediction system of claim 4, wherein the neural network classifier utilizing minimal difference to optimize the neural network module is to use the second trigger body to receive the instant data value and the historical data value from the time sequence recorder in a randomly sampling manner, with equal amount instant data value and historical data value being used to test the precision of the neural network module constructed by the first trigger body; and if the prediction error of the first trigger body divided by the historical data value is greater than a subsequent prediction error, a random sampling of the specific period is combined with another group of instant data value and historical data value to establish a new neural network module for retraining.

7. The machine abnormality marking and abnormality prediction system of claim 6, wherein establishing the new neural network module using the random sampling of said specific period is to combine renewed random sampling of the most recent said each machine in operation with the instant data value and the historical data value in past 30 days to establish the new neural network module.

8. The machine abnormality marking and abnormality prediction system of claim 1, wherein the handheld device in the abnormality reporting unit is a smart phone, tablet, or laptop.

9. The machine abnormality marking and abnormality prediction system of claim 1, wherein the protocol server comprises an object linking and embedding (OLE) for process control (OPC), which is used to read the shutdown and maintenance data of said each machine in operation, and perform transmission according to the shutdown module and the maintenance module of the streaming server.

10. The machine abnormality marking and abnormality prediction system of claim 1, wherein the database server comprises a redis cache, to periodically store the shutdown and maintenance data of said each machine in operation from the protocol server for cache use.

* * * * *